United States Patent [19]
Smith

[11] Patent Number: 5,596,757
[45] Date of Patent: Jan. 21, 1997

[54] SYSTEM AND METHOD FOR SELECTIVELY PROVIDING TERMINATION POWER TO A SCSI BUS TERMINATOR FROM A HOST DEVICE

[75] Inventor: Mark L. Smith, Laguna Beach, Calif.

[73] Assignee: Simple Technology, Inc., Santa Ana, Calif.

[21] Appl. No.: 390,749

[22] Filed: Feb. 16, 1995

[51] Int. Cl.[6] .................. G06F 1/26; G06F 1/32
[52] U.S. Cl. ............... 395/750; 395/281; 395/822; 326/30; 333/32
[58] Field of Search ............... 326/30; 395/306, 395/281, 750

[56] References Cited

U.S. PATENT DOCUMENTS

| | | | |
|---|---|---|---|
| 4,204,249 | 5/1980 | Dye et al. ................... | 395/750 |
| 4,312,035 | 1/1982 | Greene ........................ | 395/750 |
| 4,316,246 | 2/1982 | Hartley et al. ............... | 395/750 |
| 4,575,759 | 3/1986 | Griepentrog et al. ........ | 348/706 |
| 4,631,721 | 12/1986 | Ono et al. .................. | 370/85.9 |
| 4,920,339 | 4/1990 | Friend et al. ............. | 340/825.52 |
| 5,029,284 | 7/1991 | Feldbaumer et al. ......... | 326/30 |
| 5,099,137 | 3/1992 | Lattin, Jr. .................. | 307/147 |
| 5,120,909 | 6/1992 | Kutz et al. ................. | 326/30 |
| 5,157,769 | 10/1992 | Eppley et al. ............. | 395/200.01 |
| 5,163,124 | 11/1992 | Yabe et al. ................ | 395/750 |
| 5,239,559 | 8/1993 | Brach et al. ............... | 375/257 |
| 5,239,652 | 8/1993 | Seibert et al. .............. | 395/750 |
| 5,239,658 | 8/1993 | Yamamuro et al. ........ | 395/800 |
| 5,272,396 | 12/1993 | Mammano et al. ......... | 307/443 |
| 5,309,569 | 5/1994 | Warchol ..................... | 395/306 |
| 5,313,105 | 5/1994 | Samela et al. .............. | 307/99 |
| 5,313,595 | 5/1994 | Lewis et al. ................ | 395/306 |
| 5,327,172 | 7/1994 | Tan et al. ................... | 348/378 |
| 5,369,771 | 11/1994 | Gettel ........................ | 395/750 |
| 5,404,542 | 4/1995 | Cheung ...................... | 395/750 |
| 5,422,580 | 6/1995 | Mandel et al. .............. | 326/30 |
| 5,450,003 | 9/1995 | Cheon ........................ | 323/272 |
| 5,467,453 | 11/1995 | Kocis ......................... | 395/281 |
| 5,467,455 | 11/1995 | Gay et al. ................... | 395/281 |
| 5,513,373 | 4/1996 | Damkier ..................... | 395/836 |

OTHER PUBLICATIONS

PCMCIA Cards Data Sheets, STI–SCSI, Simple Technology, Nov. 1994.

Primary Examiner—Jack B. Harvey
Assistant Examiner—Sumati Lefkowitz
Attorney, Agent, or Firm—Knobbe Martens Olson & Bear

[57] ABSTRACT

A system which determines whether one of a plurality of peripheral devices on a SCSI bus is providing termination power to a bus terminator and provides termination power from a power supply associated with a host device only when none of the peripheral devices are providing termination power. The system is further configured to only provide termination power from the host device when information signals are likely to be present on the information bus. Specifically, the system only provides termination power when the host device seeks access to the information bus to thereby limit consumption of the host device's power supply.

30 Claims, 4 Drawing Sheets

SYSTEM AND METHOD FOR SELECTIVELY PROVIDING TERMINATION POWER TO A SCSI BUS TERMINATOR FROM A HOST DEVICE

BACKGROUND OF THE INVENTION

1. Field of the Invention

The present invention generally relates to a system for providing termination power to a computer bus and, in particular, concerns a system which ascertains whether termination power is already being provided by other devices on the computer bus and, if not, provides termination power on an as needed basis.

2. Description of the Related Art

Presently, the standard bus for interconnecting computers and peripheral devices is the Small Computer System Interface (generally known as SCSI) bus which is a parallel multi-master input/output bus. A SCSI bus connected network can be viewed as a chain of devices linked together by the SCSI bus wherein the SCSI bus forms a general purpose interface between each of the devices. Generally, a SCSI bus network includes a host device and up to seven other peripheral or auxiliary devices wherein the host device can be comprised of a personal computer (PC) and the peripheral devices can include equipment such as printers, auxiliary information storage devices, CD ROM drivers, etc.

Signals that travel on the bus between devices have wave-like properties. For example, when the signals travelling along the bus come to an end or termination of the bus, these signals can be reflected back along the bus unless some system has been implemented to cancel the signals reaching the termination of the bus. Reflected signals travelling back along the bus can interfere with other signals carried on the bus possibly corrupting the data carried by the bus.

For this reason, on most SCSI busses, a termination is provided at the end of the bus which inhibits the reflection of signals on the bus. A typical prior art termination is provided by a pull-up pull-down resistor pack, known as a SCSI bus terminator, that performs the function of absorbing excess energies at the end of the bus and not allowing these energies to be reflected back, along the bus.

FIG. 1 illustrates a typical prior art SCSI bus terminator for a single data or control line of the SCSI bus. Similar bus terminators are generally provided for each of the data and control lines contained on the SCSI bus. This type of bus terminator requires 5 volts and 1 amp to operate. Another type of termination used on SCSI busses is an active terminator which provides signals to actively cancel signals on the data and control lines at the termination of the bus. One common type of active termination device is a UC 5601 small computer system interface active terminator available from Unitrode Integrated Circuits. These active terminators also require a significant amount of power, e.g., 2.9 volts. In the past, the power for either type of bus terminator has been provided by the host device, e.g., the personal computer. The standard desktop personal computer generally does not have any difficulty in providing termination power for the bus terminator as it usually receives power from a standard 120 VAC electrical outlet.

However, there are some situations where it is undesirable for the host device to be the source of termination power for a SCSI bus. Specifically, portable computers, notebook computers and palmtop computers are becoming increasingly popular and more powerful. Typically, these types of computers are battery powered. If one of these types of computers is used as a host device and is linked to peripheral devices via an information bus, such as a SCSI interface, and it is to provide the termination power, the resulting drain on the battery would significantly deplete the limited energy contained in the battery. In some circumstances, termination power requirements can use up to 45% of a battery's capacity. Hence, providing termination power from the battery can significantly reduce the battery's available power and thereby significantly reduce the use of the host device.

In some circumstances, however, one of the peripheral devices can be configured to provide the termination power. This can solve the problems associated with a battery operated host device having to provide termination power provided that the termination power provided by the host device is disabled or the host device is designed to never provide termination power. If more than one device is providing termination power to the SCSI bus terminator, the bus terminator can become unreliable and the devices providing the termination power can be damaged.

While some host devices can be configured to not provide termination power, this configuration generally requires making relatively complex adjustments to the host device, e.g., setting dip switches or modifying operating instructions. Hence, even if prior art systems can be configured so that the host device does not have to provide termination power, the system can't be readily changed in the event the host device has to provide termination power, such as when the peripheral device providing termination power fails or is removed from the bus. Further, if the host device is designed to never provide termination power, the flexibility of the host device to be used with some peripheral devices is significantly limited as many peripheral devices are not designed to provide termination power either.

Hence, there is a need for a system which can sense when a peripheral device is providing termination power to an information bus and disable the termination power provided by a host device when a peripheral device is providing the termination power. However, the system should be capable of providing termination power from the host device in the event that no peripheral device is capable of providing termination power. Further, the system should be flexible so that it can be used in conjunction with a network of devices with a minimal amount of reconfiguration of the devices being required.

In the event that the host device is required to provide termination power from a limited power source, it would be desirable to control the termination power from the host device so that the energy used to provide termination power is minimized. To this end, it would be desirable to have a system which would provide the termination power from a host device with a limited power source only when the termination power is actually needed to thereby conserve the energy in the limited power source.

SUMMARY OF THE INVENTION

The aforementioned needs are satisfied by the termination power system of the present invention which detects whether termination power for an information bus is being provided by a peripheral device and, in the event that it is, disables the termination power provided by the host device. The system can also be configured so that, when termination power is provided by a limited power source, e.g., a battery, the termination power from the limited power source is disabled when the information bus is not being used.

The system can include a detector which detects whether termination power is being provided at a termination end of the information bus and provides a first signal indicative of the status of the termination power. A controller, receiving the first signal, enables the termination power in the host device when the first signal indicates that no termination power is being provided. The controller can, preferably, further be configured to determine whether the information bus is being used and, if it is not, prevent the host device from supplying termination power to further conserve power in the power supply for the host device.

In the preferred embodiment, there are two dedicated one-bit memory locations that a controller in a PCMCIA card can access. The first location is a read-only bit for the controller which signifies whether other devices are providing termination power. The second location is both a read and a write bit wherein the controller can either read the state of the bit or change the state of the bit. The second bit is used by the controller to control a switching device which supplies termination power from the host device.

The controller in the preferred embodiment is preferably programmed to provide termination power from the host device only when there is no other source of termination power and only when the host device seeks access to the bus. The termination power then remains on so long as the bus remains in use. The controller, in the preferred embodiment, can also be programmed to periodically force all of the data and control signals on the bus to a logic zero at time periods when the termination power is being sampled by the detector. This prevents any data or control signals from feeding back through the bus terminators and producing a false positive signal for the detector.

Hence, the present invention provides a system which is capable of determining when termination power is being provided by a peripheral device on the bus thereby obviating the need for a host device to supply the termination power. The present invention can also be configured to limit the termination power provided to the bus from the host device to only what is necessary when signals are being carried on the bus. Hence, the present invention is designed to preserve the amount of termination power provided by the host device and prolong the effective life of a limited power supply, such as a battery, which is powering the host device. The present invention can also be readily used with any number of different configurations of devices without requiring significant reconfiguration of the devices.

These and other objects and features of the present invention will become more fully apparent from the following description and appended claims taken in conjunction with the accompanying drawings.

DETAILED DESCRIPTION OF THE PREFERRED EMBODIMENT

Figure 2:
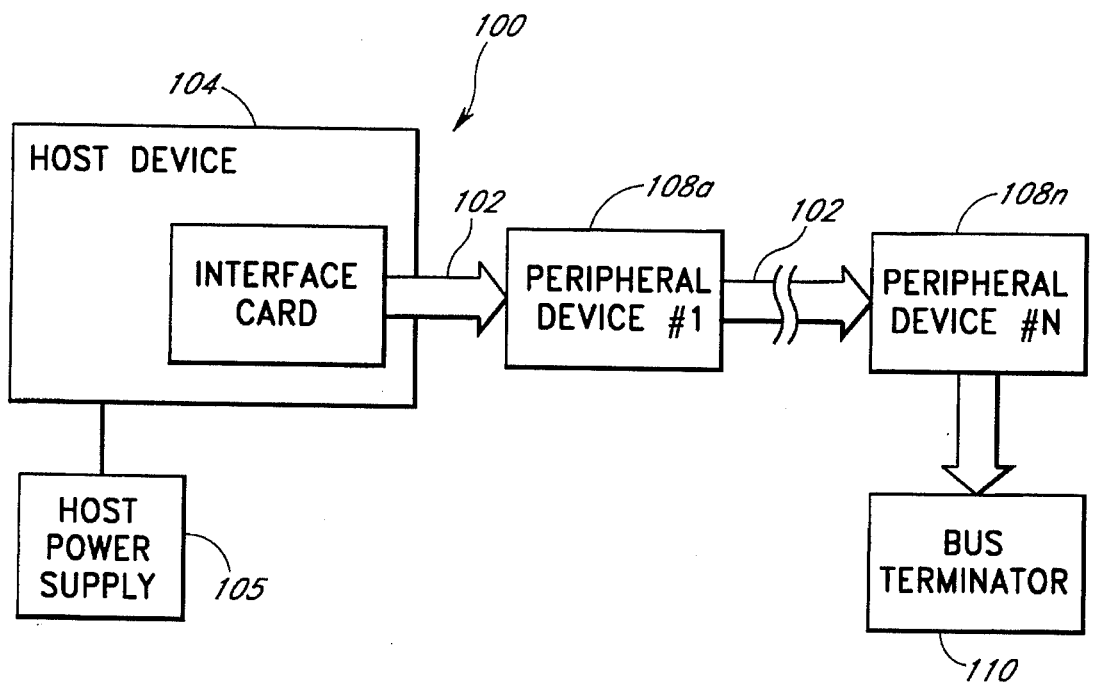
FIG. 2 is a functional block diagram illustrating a typical information bus system comprised of a network of devices interconnected by an information bus.

Reference will now be made to the drawings wherein like numerals refer to like parts throughout. Referring initially to FIG. 2, a network 100 comprised of a plurality of devices interconnected via an information bus 102 is shown. The network 100 includes a host device 104 with an interface card 106 that enables the host device 104 to send and receive signals on the information bus 102. The host device 104 is powered by a power supply 105 which can be comprised of either an external or internal battery. In one preferred embodiment, the host device 104 is comprised of a computer such as an IBM compatible PC or a Macintosh computer, that is preferably battery powered, e.g., a notebook or laptop computer. The computer preferably includes, as the interface card 106, a PCMCIA card which incorporates an information bus controller.

Figure 1:
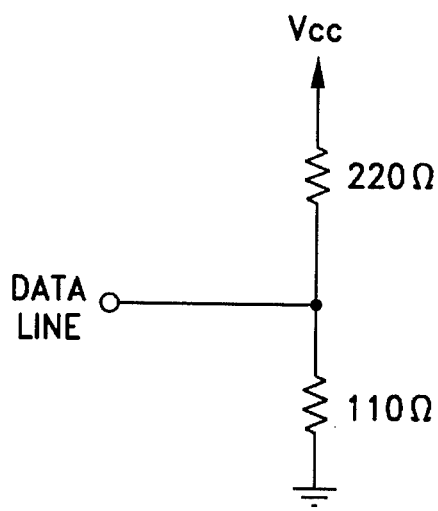
FIG. 1 is an electrical schematic of a typical prior art bus terminator.

The information bus 102 allows the host device 104 to send signals to one or more peripheral devices 108a–108n. The peripheral devices in the preferred embodiment include such things as auxiliary memory units, CD ROM drivers, printers, modems and the like. The information bus 102 in the preferred embodiment is a Small Computer System Interface (SCSI) which enables the computer to be interconnected to up to seven different peripheral units. At the end of the information bus 102, a bus terminator 110 is connected to the bus to provide termination power to the bus and thereby prevent reflection of signals along the bus. In the preferred embodiment, the bus terminator 110 can be comprised of a bus terminator which includes a plurality of the prior art SCSI bus terminators illustrated in FIG. 1 or it can be comprised of a prior art active terminator.

Figure 3:
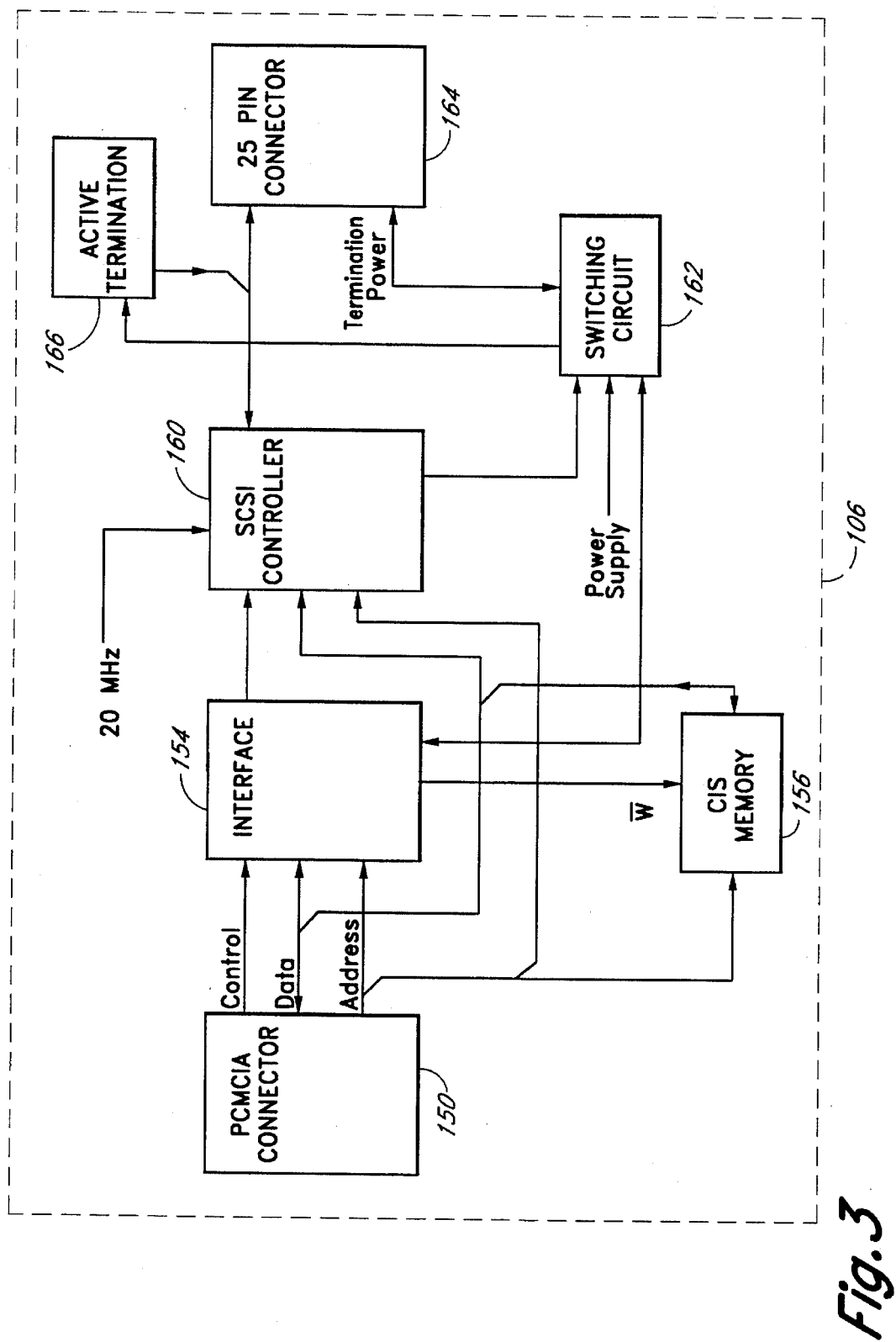
FIG. 3 is a functional block diagram illustrating a preferred embodiment of a termination control system of the present invention which can be implemented on the information bus system of FIG. 2.

FIG. 3 is a functional block diagram which illustrates the components of the interface card 106 in the network 100 that incorporates a preferred embodiment of a termination power control system 111 (See, FIG. 4) of the present invention. In this case, the interface card 106 is comprised of a PCMCIA card that includes a PCMCIA connector 150 that interconnects the PCMCIA card to the host device 104. The PCMCIA connector 150 provides control, data and address signals to an interface 154, receives data signals from the interface 154, and provides data and address signals to a CIS memory 156 and a SCSI controller 160.

The interface 154 translates signals received from the PCMCIA connector 150 into signals which are then used by the SCSI controller 160 to control the information bus 102. The CIS memory 156 is an area of memory which describes the attributes of the PCMCIA card. The interface 154 also preferably provides signals to, and receives signals from, a switching circuit 162 that is used to switch termination power for the bus terminator 110 (FIG. 2) from either a power supply in the host device 104 or from a power supply in one of the peripheral devices 108. The switching circuit 162 provides termination power via a standard 25 pin SCSI bus connector 164. Further, the switching circuit 162 can also be used to enable an active termination device 166 which can provide active termination, i.e., actively cancel noise on the bus by sending appropriate signals to an active terminator. The components and operation of the switching circuit 162 are described in greater detail in reference to FIGS. 3 and 4 below.

The controller 160 controls the flow of information signals, e.g., data and control signals, along the information bus 102. The controller 160, in response to commands from the host device 104, sends appropriate information signals onto the information bus 102 in a well known manner via the connector 164 to carry out the commands of the host device 104. In this preferred embodiment, the controller 160 is a 18C30 SCSI Bus Controller made by Future Domain of Irvine, Calif. The controller 160, in this preferred embodiment, receives a 20 MHz clock signal. The controller 160 carries out a set of well known programmed instructions to control the information flow along the information bus and, in this embodiment, the controller 160 also carries out a set of programmed instructions which controls how and when termination power is provided to the bus terminator 110.

Figure 4:
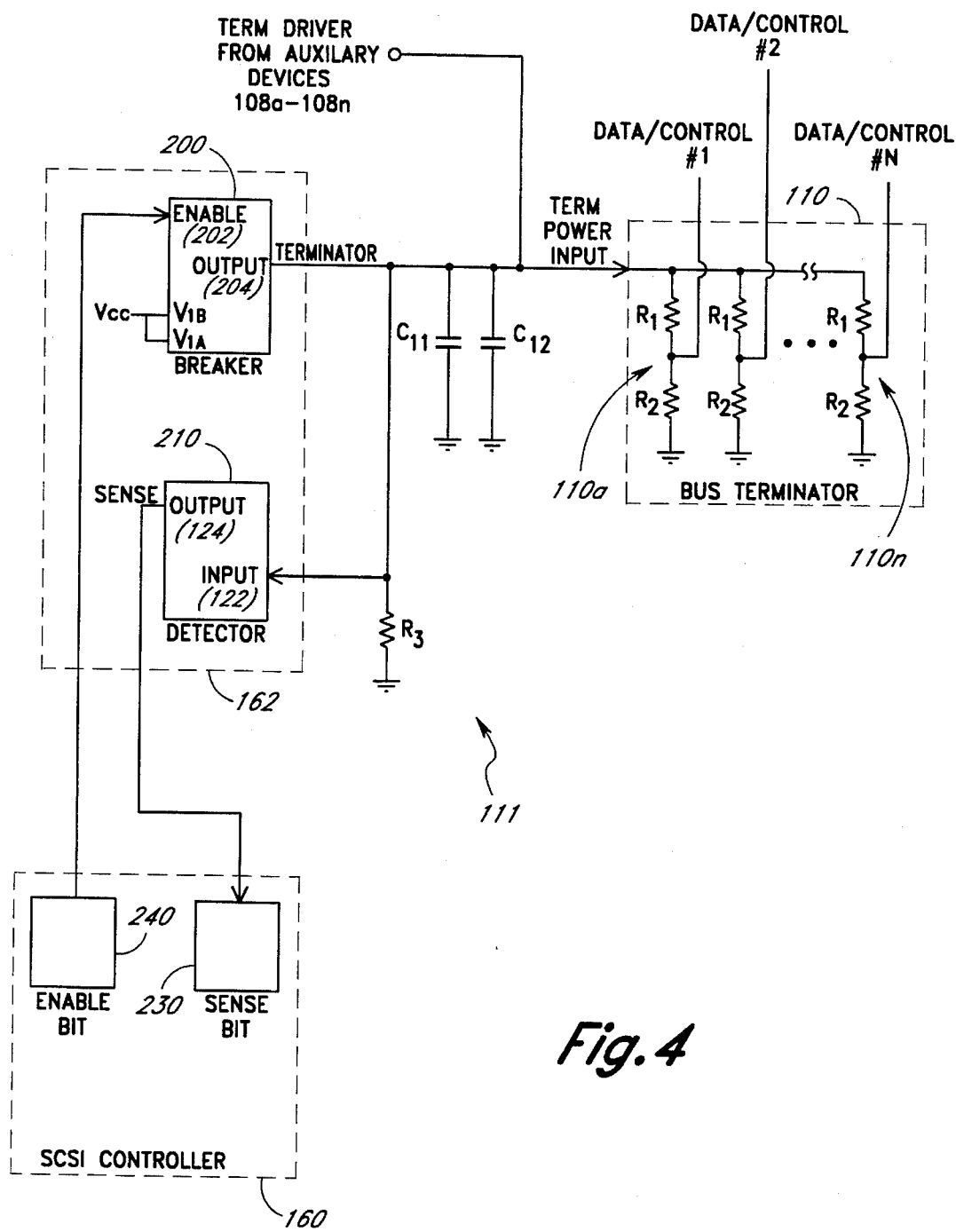
FIG. 4 is a schematic of a termination power detector comprising a portion of the termination power control system of FIG. 3.

FIG. 4 illustrates the components of the termination power system 111 which determines whether termination power is being supplied to the bus terminator 110 from one of the peripheral devices, and provides termination power from the host device when needed. The bus terminator 110 shown in FIG. 4 is comprised of a plurality of bus terminators 110a-110n wherein a bus terminator is provided for each data and each control line on the information bus 102. The bus terminators 110a-110n are powered by a TERMPOWER signal that is provided by either the host device 104 or by one of the peripheral devices 108a-108n. Preferably, the TERMPOWER signal line from the auxiliary devices 108a-108n is coupled with the TERMPOWER signal line from the host device 104 at a termination power input 120 to the bus terminator 110. While the bus terminator 110 is illustrated as comprised of standard prior art bus terminators, it should be readily understood that the bus terminator 110 can also be comprised of active terminators of the type described above. In the event the bus terminator 110 is an active terminator, the TERMPOWER signal lines from each of the peripheral devices 108a-108n and the host device 104 are still connected to a termination power input 120 to the active terminator, however, the supply signal may have to be changed to meet the requirements of the active terminator.

The TERMPOWER signal from the host device 104 is provided via. a breaker 200 within the switching circuit 162 (FIG. 3). The breaker 200 is preferably powered by a power signal $V_{cc}$ from the host device power supply 105. The breaker 200 also receives an enable input 202 from the bus controller 160. A high signal from the controller 160 to the enable input 202 activates the breaker 200 so that the host device 104 provides the termination power to the termination power input 120 of the bus terminator 110 via a TERMPOWER output 204 and a low signal on the enable input 202 prevents the host device 104 from providing termination power to the bus terminator 110.

The switching circuit 162 further includes a detector 210 having an input 212 wherein the voltage on the termination power input 120 to the bus terminator 110 is sampled. The detector 210 provides a SENSE signal on an output 214 to the controller 160 via the interface 154 (FIG. 3) which is indicative of whether termination power is being provided to the bus terminator 110. In the preferred embodiment, the detector 210 is biased by a resistor $R_3$ having a value of 10kΩ. Further, the termination power input 120 to the bus terminator 110 is also biased by two capacitors $C_{11}$ and $C_{12}$ which have values of 3.3 μF and 0.1 μF respectively.

The hardware illustrated in FIG. 4 is capable of detecting whether termination power is being provided to the bus terminator 110 and selectively providing termination power from the host device 104 via the breaker 200. Further, the controller 160 receives the digital SENSE signal from the detector 210, which is indicative of whether the bus terminator 110 is receiving termination power at any one time, and the SENSE signal is preferably stored in a SENSE read only bit memory location 230 in the controller 160. The controller 160 can also control whether termination power is provided by the host device 104 by sending an appropriate signal to the ENABLE input 202 of the breaker 200. The ENABLE signal is preferably a digital signal that is stored in an ENABLE read and write bit memory location 240 in the controller 160.

Figure 5:
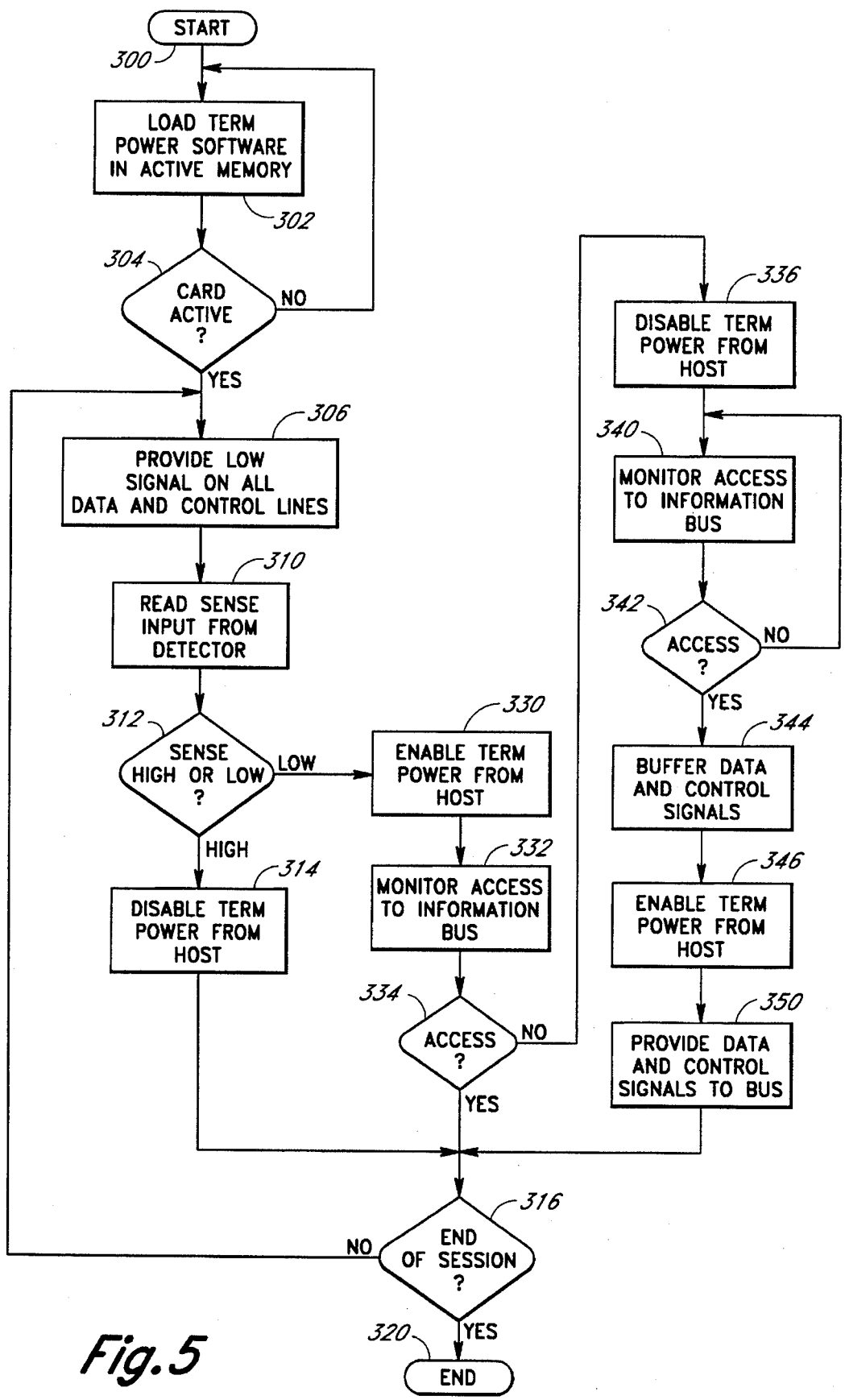
FIG. 5 is a flow chart illustrating the functional operation of the termination control system of FIG. 3.

The controller 160 uses the SENSE bit 230 to control the termination power provided to the bus terminator 110 in accordance with the flow chart illustrated in FIG. 5. More specifically, the SENSE bit 230 changes only in response to the detected state of the termination power input 120 of the bus terminator 110 and the controller 160 uses the SENSE bit 230 to determine whether one of the peripheral devices 108a-108n is providing the termination power to the bus terminator 110. If one of the auxiliary devices 108a-108n is providing termination power, the controller 160 reads the SENSE bit 230 as high and then disables the termination power provided by the host device 104 by changing the ENABLE bit 240 to a low signal which is then sent to the enable input 202 of the breaker 200. If none of the peripheral devices 108a-108n is providing termination power, the SENSE bit 230 is changed to low by the detector 210 and the controller 160 then changes the ENABLE bit 240 to high and a high signal is then sent to the ENABLE input 202 of the breaker 200 so that the breaker 200 turns on thereby providing termination power to the bus terminator 110 from the power supply 105 of the host device 104.

The operation of the termination power control system 111 in controlling the termination power will now be described in reference to the flow chart in FIG. 5. The flow chart is illustrative of the functional steps performed by the termination power control system 111 while termination power is provided to the bus terminator 110. It can be appreciated that the exact operation of the control system 111 and the controller 160 in carrying out the functional steps shown in the flow chart in FIG. 5 can vary depending upon how the system 111 is implemented. In this preferred embodiment, the flow chart in FIG. 5 illustrates a program contained in the host computer's configuration software.

From a start state 300, the termination power software, of which the flow chart in FIG. 5 is illustrative, is downloaded into an active memory position within the host device 104. In the preferred embodiment, the host device 104 is a computer and by loading the software into an active memory, the termination power control routine illustrated in FIG. 5 can be implemented at any time, after the host device 104 has been turned on, when access to the information bus 102 is requested by the host device 104.

Once the software has been loaded to an active memory, the power control system 111 then determines in decision state 304 whether the interface card 106 has been accessed by the host device 104. Once the host device 104 accesses the interface card 106 to make use of the information bus 102, the controller 160 on the interface card 106 is activated to carry out the control of termination power of the information bus 102, as described in states 306–350 hereinbelow.

The controller 160 first determines in states 306–312 whether any of the peripheral devices 108a–108n are providing termination power to the bus terminator 110. To accomplish this, the controller 160 initially, in state 306, sends a low signal on all of the data and control lines of the information bus 102. The controller 160 then reads in state 310 the SENSE bit 230 that is responsive to the SENSE signal provided by the detector 210 which is indicative of the state of the termination power input 120 to the bus terminator 110 (FIG. 4). The detector 210 samples the termination power input 120 to the bus terminator 110 and, if any of the peripheral units 108a–108n is providing termination power, it provides a high signal on the SENSE output 214 changing the SENSE bit 230 to high. However, if none of the peripheral units 108a–108n are providing termination power, then the detector sends a low signal on the SENSE output 214 changing the SENSE bit 230 to low.

It can be appreciated that, if there are any high signals on any of the data or control lines when the detector 210 samples the termination power input 120, the high signals may feed back through the resistors $R_1$ to the termination power input 120 causing the detector 210 to incorrectly determine that termination power is being provided by one of the peripheral devices 108a–108n, i.e., read a false high signal. To avoid this problem, the controller 160 is preferably programmed to send a blanking signal on all of the data and control lines on the information bus 102 in state 306 so that there are no high signals when the detector 210 samples the termination power input 120.

The controller 160 then determines in decision state 312 whether the SENSE bit 230 is high or low. If the SENSE bit 230 is high, one of the peripheral devices 108a–108n is providing termination power at the termination power input to the bus terminator 110. The controller 160 then disables the termination power provided by the host device 104 by changing the ENABLE bit 240 to low in state 314 causing a low signal to be received by the ENABLE input 202 of the breaker 200 which results in the breaker 200 disconnecting the host power supply 105 (FIG. 2) from the power termination input 120 of the bus terminator 110 (FIG. 4). In this way, the power supply of the host device 104 is not depleted by providing termination power when termination power is being supplied by another device.

The controller 160 then determines in decision state 316 whether the end of a session of use of the host device 104 has occurred. In the preferred embodiment, the end of a session of use occurs when the operator of the host device 104 turns the device off, or disables the device 104 from access to the information bus 102. If the end of the session has not occurred, the controller 160 preferably returns to state 306 wherein the controller 160 again determines whether termination power is being provided by one of the peripheral devices 108a–108n.

Alternatively, if the controller 160 determines in state 312 that the detector 210 is providing a low signal on the SENSE output 214, i.e., the SENSE bit 230 is low, indicating that no termination power is being provided by the peripheral devices 108a–108n, the controller 160 changes the ENABLE signal bit 240 so that a high signal is sent to the ENABLE input 202 of the breaker 200. This causes the breaker 200 to provide a high signal on the TERMPOWER output 204 in state 330 thereby supplying termination power from the power supply 105 of the host device.

Since the termination power control system 111 is configured so that it can be used with a battery powered host device 104, the termination power control system 111 should also be configured so that when termination power is being provided by the host device, termination power is provided only when needed. More specifically, termination power is generally only needed when signals are being transmitted on the information bus 102 and providing termination power when no signals are being transmitted on the bus 102 causes the battery power to be diminished unnecessarily.

To address this problem, the controller 160, in state 332, monitors the data and control lines to determine whether the information bus 102 is being accessed or used. The controller 160 then determines, in decision state 334, whether the information bus has been accessed during a previous pre-determined period of time. In the preferred embodiment, the pre-determined period of time can be set by the person configuring the system. If the bus 102 has not been accessed, then there are no signals currently on the information bus 102 and the controller 160 disables the termination power from the host device 104 in state 336 by changing the ENABLE signal bit 240 to low so that a low signal is sent to the ENABLE input 202 of the breaker 200. This interrupts the supply of termination power from the host device 104 which minimizes the drain on the host device power supply 105 when there are no signals on the information bus 102.

The controller 160 then continues, in state 340, to monitor whether the host device 104 is seeking access to the information bus 102. If the controller 160 determines in decision state 342 that the host device 104 is seeking access to the information bus 102 by, for example, the host device sending information signals to one of the peripheral device 108a–108n, the controller 160 then buffers the data and control signals in state 344 and enables the termination power from the host device 104 in state 346. The termination power from the host device 104 is enabled in state 346 by the controller 160 changing the ENABLE bit 240 to high so that a high signal is sent to the ENABLE input 202 of the breaker 200 thereby inducing the breaker 200 to output a high signal on the TERMPOWER output 204.

Once the termination power to the bus terminator 110 has stabilized, the information signals, e.g., data and control signals, that were stored in a buffer in state 344 are then provided to the information bus in state 350. Buffering the data and control signals until the termination power has stabilized prevents the signals from being corrupted by an improperly operating bus terminator 110. The controller then decides in decision state 316 whether the end of the session has occurred. If the end of the session has not occurred, the controller 160 returns to state 306 wherein a blanking signal is provided on the data and control lines to determine whether one of the peripheral devices 108a–108n is providing termination power and the process of states 310–350 is repeated until the end of the session.

It can be appreciated that the termination power control process can be programmed so that the blanking signal of state 306 is only sent at periodic intervals rather than each time the loop comprised of the steps 310–350 is completed. Further, the controller 160 can be programmed to store any information signals in a buffer while the blanking signal is sent to prevent the loss of any data during the blanking signal.

From the foregoing, it can be appreciated that the termination power control system 111 periodically checks to see if termination power is being provided by an auxiliary or peripheral device and, if so, it disables the termination power provided by the host device. However, if termination power is not being provided by an auxiliary or peripheral device, the termination power control system then provides the termination power from the host device. The termination power control system is further configured to provide termination power from the host device only when needed, e.g., only when signals are being transmitted on the information bus, to further limit the drain of power from the host device power supply.

It can also be seen that the termination power control system can be adapted to be used with any number of peripheral devices on a common information bus without requiring a significant amount of programming of the system. Specifically, for the standard SCSI bus interface, the installer of the system simply has to connect the detector to the termination power input and the system will automatically determine whether to supply termination power.

Although the foregoing description of the preferred embodiment of the present invention has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit of the present invention. Consequently, the scope of the invention should not be limited to the foregoing discussion, but should be defined by the appended claims.

What is claimed is:

1. A system for providing termination power to an information bus interconnecting a host device having a host power supply and one or more peripheral devices, at least one of said devices producing information signals that are output to said bus, at least one of said devices having circuitry which detects both whether said termination power is being provided to a bus terminator from said one or more peripheral devices and whether information signals are present on said bus, said system providing termination power from said host power supply to said bus terminator when said circuitry detects that said termination power is not being provided to said bus terminator from said one or more peripheral devices and information signals are present on said bus.

2. The system of claim 1, wherein said circuitry detects whether information signals will be output to said bus within a first time period and said system additionally provides termination power to said bus terminator when information signals will be output to said bus within said first time period.

3. The system of claim 1, wherein said system comprises a detector that samples a termination power input to said bus terminator and provides a first signal indicative of whether termination power is being provided to said bus terminator from said one or more peripheral devices.

4. The system of claim 3, wherein said host device comprises said circuitry and wherein said system comprises a controller which receives said first signal from said detector and causes termination power to be supplied to said bus terminator when said first signal indicates that no termination power is being provided to said termination power input of said bus terminator.

5. The system of claim 4, wherein said system comprises a switching device responsive to signals from said controller, wherein said switching device enters a first state wherein termination power is supplied to said bus terminator from said host device when said controller determines no termination power is being supplied to said bus terminator from said peripheral device.

6. The system of claim 5, wherein said switching device enters a second state wherein said host device is prevented from providing termination power to said bus terminator in response to said controller determining that termination power is being provided to said bus terminator from said one or more peripheral devices.

7. The system of claim 6, wherein said controller receives a second signal from said host device indicative of whether access to said information bus is sought by said host device.

8. The system of claim 7, wherein said controller induces said switching device to enter said first state in response to both receiving said first signal from said detector, indicating that no termination power is being supplied to said bus terminator from said one or more devices, and said second signal from said host device.

9. The system of claim 1, wherein said information bus is comprised of a SCSI bus and said bus terminator is comprised of a plurality of pull-up, pull-down bus terminators.

10. The system of claim 1, wherein said information bus is comprised of a SCSI bus and said bus terminator is comprised of an active terminator.

11. The system of claim 1, wherein said host device is comprised off a personal computer having a PCMCIA interface card that includes a bus controller that is configured to provide termination power to said bus terminator in response to determining that said one or more peripheral devices is not providing termination power to said bus.

12. A system for providing termination power to a bus terminator on an information bus that interconnects a host device and one or more peripheral devices comprising:

a detector which detects whether said bus
terminator is receiving termination power from said one or more peripheral devices and provides a first signal indicative thereof;

a bus controller which controls information signals on said information bus wherein said bus controller receives said first signal from said detector and produces a second signal when said first signal indicates that said one or more peripheral devices are not providing termination power to said bus terminator; and a switching device, engaged with a power supply providing power to said host device, that provides termination power to said bus terminator from said power supply in response to receiving said second signal from said controller.

13. The system of claim 12, wherein said bus controller produces said second signal only when said bus controller detects information signals going to said information bus.

14. The system of claim 13, wherein said bus controller produces a third signal when said bus controller detects that no information signals are going to said information bus and said switching device interrupts termination power to said bus terminator from said power supply on said host device in response to receiving said third signal from said controller.

15. The system of claim 14, wherein said bus controller buffers information signals going onto said information bus when said controller determines that said bus terminator is not receiving termination power from either said host device or said peripheral devices, provides said second signal to said switching device and releases said information signals from a buffered state only after a first period of time selected to allow said bus terminator to settle into a normal operating state after said bus termination power from said host device has been provided to said bus terminator.

16. The system of claim 12, wherein said bus controller sends a blanking signal on said information bus prior to said detector detecting whether said bus terminator is receiving termination power from one of said peripheral devices, wherein said blanking signal is configured so that said detector does not falsely detect that one of said peripheral devices is providing said termination power to said bus terminator.

17. The system of claim 16, wherein said blanking signal comprises sending digital low signals on all data and control lines in said information bus.

18. The system of claim 17, wherein said first signal is provided by said detector only after said bus controller has caused low data and control signals to be sent on said information bus.

19. The system of claim 12, wherein said information bus is comprised of a SCSI bus and said bus controller is comprised of a SCSI bus controller that carries out a pre-programmed set of software instructions.

20. The system of claim 19, wherein said bus terminator is comprised of an active terminator.

21. The system of claim 12, wherein said bus controller stores said first signal into a first read only bit memory location and wherein said bus controller stores said second signal into a second read and write bit memory location.

22. The system of claim 12, wherein said host device is comprised of a personal computer and said one or more peripheral devices include an auxiliary storage device, a CD ROM driver and a modem.

23. The system of claim 22, wherein said personal computer includes a PCMCIA card and said bus controller, said switching device and said detector are positioned on said PCMCIA card.

24. The system of claim 23, wherein said bus controller implements a software instruction set stored in a configuration file contained within said personal computer, wherein said software instruction set is stored in a position in said personal computer wherein said software instruction set is provided to said bus controller whenever said personal computer seeks access to said information bus.

25. A method of providing termination power to a bus terminator on an information bus interconnecting a plurality of devices including a host device having a power supply and one or more peripheral devices wherein at least one of said one or more peripheral devices has a first power supply associated therewith, comprising the steps of:

detecting whether said bus terminator is receiving power from said one or more of said peripheral devices;

detecting whether information signals are present on said information bus or will be present on said information bus within a first time period; and providing termination power from said power supply associated with said host device only when said bus terminator is not receiving power and information signals are on said information bus.

26. The method of claim 25, wherein the step of providing termination power from said power supply associated with said host device comprises providing termination power from said power supply associated with said host device only when said bus terminator is not receiving power and information signals will be present on said information bus within said first time period.

27. The method of claim 25, wherein the step of detecting whether said bus terminator is receiving termination power from said one or more peripheral devices comprises:

sampling a termination power input to said bus terminator; and providing a first signal indicative of the state of said termination power input.

28. The method of claim 25, wherein the step of detecting whether information signals are present on said bus or will be present on said bus within said first time period comprises the step of detecting whether said host device has sought access to said bus to provide information signals on said information bus.

29. The method of claim 25, further comprising the step of interrupting termination power from said power supply associated with said host device when no information signals are detected on said information bus after a pre-selected time period.

30. The method of claim 29, further comprising the step of resuming the supply of termination power from said power supply associated with said host device upon detecting that said host device is seeking access to said information bus.

* * * * *